United States Patent [19]

Marquess et al.

[11] 4,455,282

[45] * Jun. 19, 1984

[54] ELECTRIC FURNACE FOR CONTINOUSLY HEATING AND REGENERATING SPENT ACTIVATED CARBON

[76] Inventors: Gerald E. Marquess, 100 Hudson St., New York, N.Y. 10013; David J. Nell, Lotus Ave., Oradell, N.J. 07649

[*] Notice: The portion of the term of this patent subsequent to Feb. 15, 2000 has been disclaimed.

[21] Appl. No.: 415,268

[22] Filed: Sep. 7, 1982

Related U.S. Application Data

[63] Continuation-in-part of Ser. No. 281,691, Jul. 9, 1981, Pat. No. 4,374,092.

[51] Int. Cl.³ .......................... B01J 4/00; B01J 8/12; B01J 20/34
[52] U.S. Cl. .................................. 422/199; 34/171; 373/116; 422/224; 422/233; 432/102; 432/199
[58] Field of Search ............... 422/199, 216, 223, 224, 422/228, 232, 233; 34/171, 178; 373/115, 116; 432/102, 199

[56] References Cited

U.S. PATENT DOCUMENTS

| | | |
|---|---|---|
| 1,155,402 | 10/1915 | Bornmann .......................... 34/171 |
| 1,988,798 | 1/1935 | Vogel-Jorgensen ................. 34/171 |
| 2,238,516 | 4/1941 | Chatterton ......................... 422/233 |
| 2,361,151 | 10/1944 | Reed .................................. 34/171 |
| 2,780,310 | 2/1957 | Schaub ............................. 422/216 |
| 2,799,625 | 7/1957 | Drew ................................. 422/216 |
| 3,032,398 | 5/1962 | Clair ................................. 422/199 |
| 3,423,840 | 1/1969 | Beeken ............................. 34/171 |
| 4,201,695 | 5/1980 | Juntgen et al. ................... 422/216 |
| 4,339,306 | 7/1982 | Janusch ............................ 34/171 |
| 4,374,092 | 2/1983 | Marquess et al. ................ 422/199 |

Primary Examiner—Bradley Garris
Attorney, Agent, or Firm—Webb, Burden, Robinson & Webb

[57] ABSTRACT

A furnace for heating particulate material comprises an air-tight shell and a heat insulating lining which define a hollow shaft. Electrical resistance heating elements spaced along the length of the hollow shaft adjacent the insulating lining. A baffle system supported within the shaft promotes heating by radiation and convection. The baffle system has side supports vertically positioned within the shaft, a plurality of inner trays each defining pairs of sloping surfaces joined at a ridge, and a plurality of outer trays each defining a sloping surface. The outer trays are arranged to receive material falling from an inner tray thereabove and to deliver material to the ridge of an inner tray therebelow.

3 Claims, 3 Drawing Figures

ELECTRIC FURNACE FOR CONTINUOUSLY HEATING AND REGENERATING SPENT ACTIVATED CARBON

DESCRIPTION

Related Application

This application is a continuation-in-part of U.S. patent application Ser. No. 281,691, filed July 9, 1981, now U.S. Pat. No. 4,374,092.

BACKGROUND

This invention relates to an improved furnace for regenerating spent activated carbon. It is useful for the regeneration of carbon exhausted, for example, at food processing plants, water pollution control facilities, wastewater treatment plants and industrial wastewater purification systems.

The regeneration of spent carbon requires drying the carbon at a temperature up to 100° C., followed by baking up to, say, 600° C. to volatilize the adsorbates, followed by activating the carbon at a temperature up to, say, 800° C. in the presence of steam to oxidize the carbon surfaces freed from the decomposed adsorbates.

Prior art systems and methods for thermal regeneration comprise introducing spent activated carbon into a furnace chamber which is more or less indirectly heated while introducing steam. Typically, the indirect heating involves combustion of gases as, for example, is taught in U.S. Pat. Nos. 1,599,072; 1,784,536; 2,933,454; 2,966,447; 4,007,014; 4,008,994; 4,221,560; Belgium Pat. No. 769,439 and Japanese Patent Document 52-12696. One prior art patent suggests use of infrared heating lamps to heat the carbon material passed thereunder on a moving conveyor. See U.S. Pat. No. 4,050,900. The Japanese patent document suggests electrical resistors buried in the spent carbon. The Belgium patent teaches passing an alternating current through a metal housing and a conveyor for moving carbon through the housing.

An electrically heated carbon regeneration process has great appeal because it can enable economic recovery at small capacities. Until this time, due to the capital expense of gas-fired rotary hearth-type furnaces, small capacity, say 100 to 200 pounds per hour, systems were not considered economic. Moreover, whenever gas-fired furnaces are used it is necessary to have well-trained operators pay very close attention to the operation of the furnace. Electric heating is much less dangerous and requires less tending. While electric heating is much more efficient than gas heating, with the greater cost per BTU for electric energy the operating costs (for energy) are about the same for both gas and electric heating. For the small capacity operation where spent activated carbon materials is now being discarded rather than reactivated, the electrically heated system described herein fulfills a definite need.

Today, most activated carbon is regenerated in gas- or oil-fired multiple hearth furnaces or rotary kilns. Dewatering of the carbon is performed in a dewatering screw which only reduces the moisture content to about 50% by weight. The result is that a large amount of energy is used to vaporize and heat the moisture along with the carbon. Thus a typical gas heated furnace presently uses approximately one million BTUs of energy from natural gas in order to regenerate 166 pounds per hour of carbon. This corresponds to approximately 6000 BTUs per pound. In an electric furnace with a solid-liquid separator as described in this application, the same quantity of carbon would be regenerated using 119,000 BTUs of electric energy per hour. This corresponds to approximately 700 BTUs per pound. This saving in total energy requirement is, of course, substantial.

Typically about 150 pounds per hour steam is required with the gas-fired furnace. With the electric-heated furnace described herein, steam generation is no longer required.

When a gas-fired furnace starts from a cold condition, the refractory lining of the furnace is warmed for about two days before regeneration begins. The electric furnace described herein is insulated with material which may have an insulating value of approximately three times the value of refractory linings in gas-fired furnaces. Therefore, the electric furnace will be able to output regenerated carbon approximately one-half hour after the decision is made to begin regeneration. Heat now expended to warm the furnace is therefore saved.

With the present equipment it is quite difficult to perform an optimum regeneration job. There are air leaks in the furnace inherently associated with the burners. With the furnace according to this invention, both the top, bottom and doors are completely sealed and therefore the furnace atmosphere can be controlled more exactly and the excess combustion of good carbon can be avoided. Carbon losses are reduced. In the furnace described herein, the carbon is gently conveyed by gravity downward through the furnace.

Existing gas-fired furnaces exhaust approximately 16,000 scfh of exhaust gases at a regeneration rate of 166 pounds of carbon per hour. The electric regeneration furnace exhausts less than 1/20th of this amount.

SUMMARY OF THE INVENTION

Briefly, there is provided a furnace useful for reactivating spent activated carbon material. Partially dried material is delivered to the electrically heated furnace which is sealed from the atmosphere. The furnace has a system of baffles which channels the carbon material flow therethrough in a sinous path. The baffle system comprises side supports vertically positioned within a furnace shaft. A plurality of inner trays define pairs of sloping surfaces joined at a ridge. A plurality of outer trays define sloping surfaces arranged to receive material falling from the inner trays and to deliver material to the ridge of the inner trays therebelow. The trays and side supports are arranged to promote radiation and convection heating of the material moving through the baffle system. A device at the bottom of the furnace controls the outflow of carbon material from the furnace and thus the rate of flow through the furnace. As the carbonaceous material, for example, passes through the furnace, it is completely dried and the water thereon is turned to steam. Adsorbates on the surface of the carbon volatilize and then burn forming combustion products.

THE DRAWINGS

Further features and other objects and advantages of this invention will become clear from the following description of the preferred embodiment made with reference to the drawings in which FIG. 1 is a schematic illustrating the system using a furnace according to this invention;

DESCRIPTION OF THE PREFERRED EMBODIMENT

Figure 1:
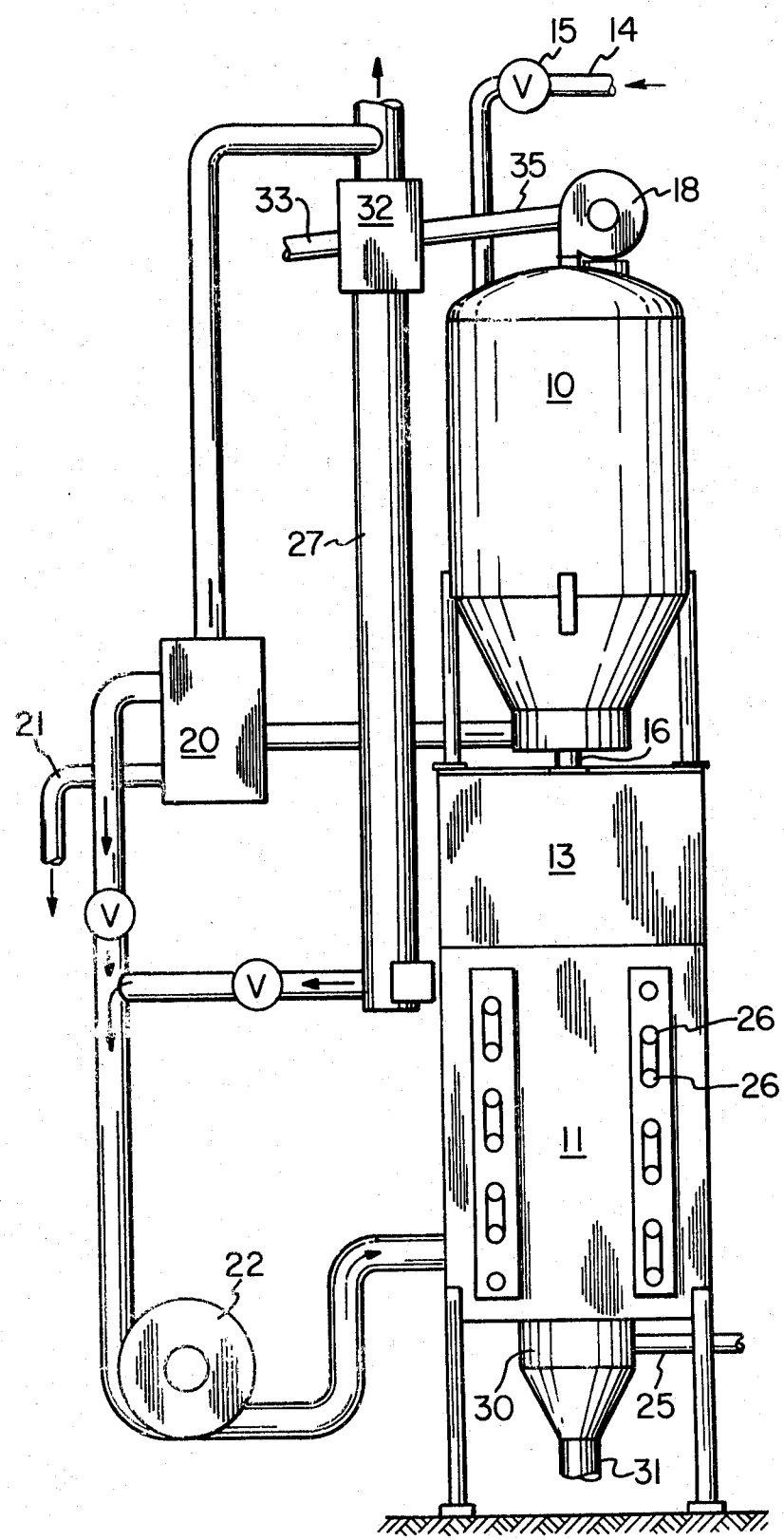
Figure 2:
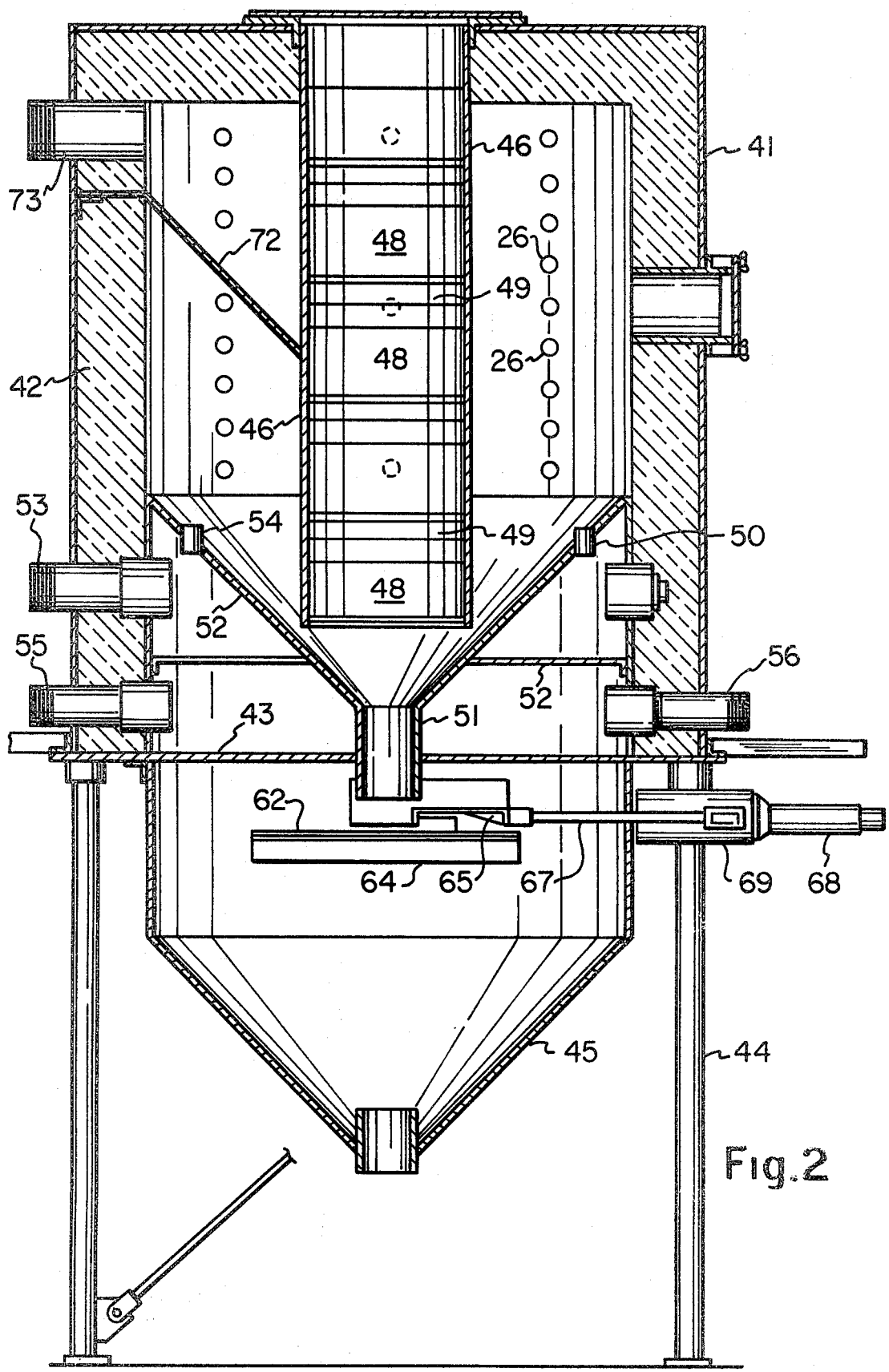
FIG. 2 is a front section of a furnace according to this invention.
Figure 3:
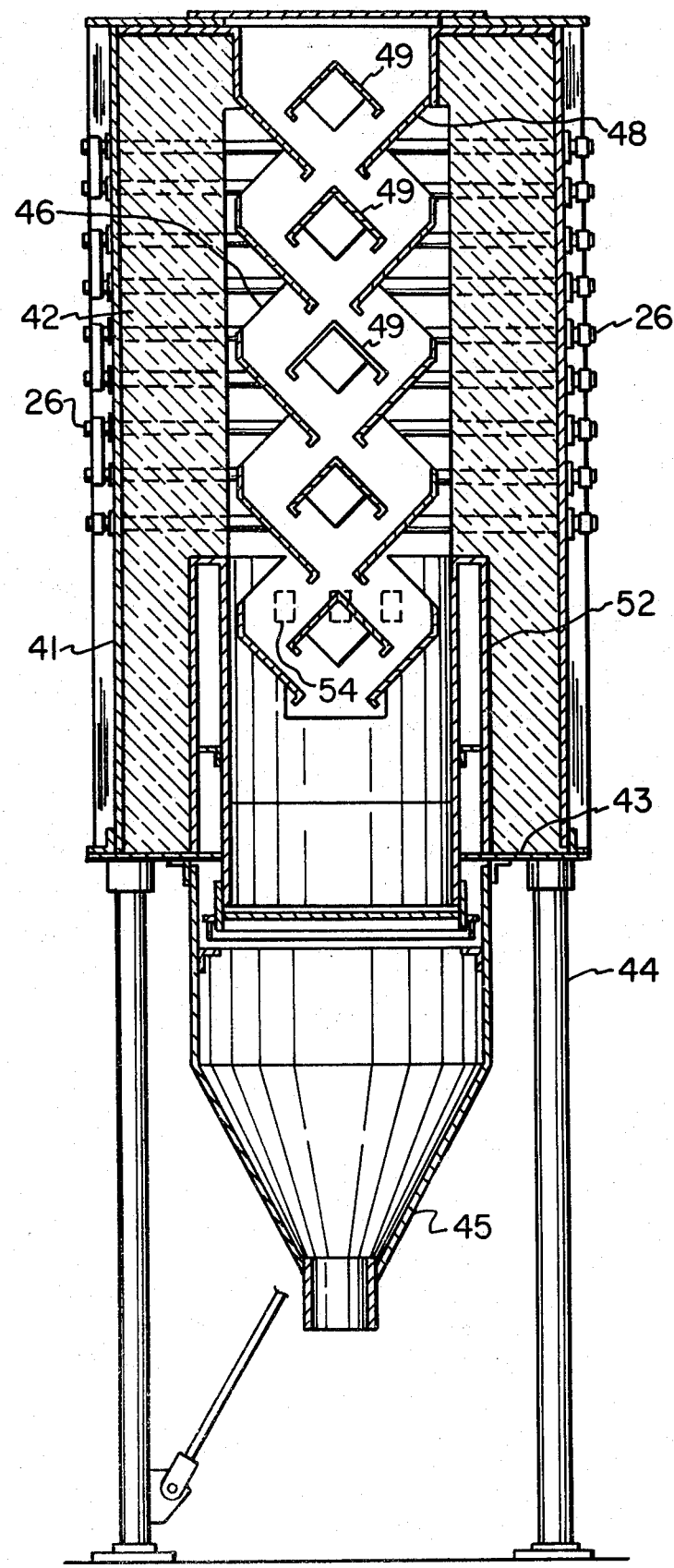
FIG. 3 is a lateral section of the furnace as shown in FIG. 2.

Referring now to FIGS. 2 and 3, the details of an electric furnace are described. (FIG. 1 relating to a system in which the furnace may be used is described hereafter.) The furnace comprises an air-tight shell 41 with an insulating lining 42 along the sides and top. The furnace rests on a steel bottom plate 43. The furnace is supported above the ground by standards 44.

Hanging below the bottom plate is a bottom hopper 45 which contains the positive flow discharge mechanism 25. Hanging downwardly into the furnace are parallel reaction tray side plates 46. Supported from the side plates are outer reaction trays 48 and inner reaction trays 49. These reaction trays have a slope of about 45° to the horizon. As best shown in FIG. 3, the inner trays comprise a pair of surfaces meeting to form a ridge with each surface sloping outwardly and downwardly. The outer trays comprise surfaces extending inwardly and downwardly. Pairs of outer tray surfaces converge to deliver the materials carried thereby over the ridge of an inner tray positioned therebelow. The inner and outer trays are arranged such that material cannot fall through the trays except by alternately traversing inner and outer trays.

As best shown in FIG. 3, the side plates 46 have openings therein just below the inner trays. Also, space above the upper edges of the outer trays is open. This arrangement provides for easy access to the material passing over the trays by radiation from the heating element and for circulation of convection gases. The flowing bed of material is exposed on one side and then the other as it moves from one tray to the next. This improves the uniformity of heating and treating of the materials in the flowing bed.

Near the bottom of the furnace is a heat exchanger box 50 that has a top surface shaped to define a hopper for gathering material that flows from the bottommost reaction tray 48 and delivers the material to a conduit 51 passing through the bottom plate 43. The heat exchanger box 50 along with heat exchanger baffle 52 define a plenum. Recirculation gases are introduced into the plenum through port 53. The hot material on the top side of the heat exchanger box 50 transfers heat to the gases introduced through port 53 to the plenum. Outlets 54 in the heat exchanger box 50 distribute recirculation gases to the furnace. A second plenum is defined between the heat exchanger baffle 52 and the furnace bottom 43. Cooling air may be introduced through port 55 and exhausted through port 56. The air from port 56 may be used as preheated dry air for introduction into the separator 10.

A table 62 is mounted between support angles 64 within the bottom hopper 45. A discharge rake 65 moves back and forth over the table 62 activated by rake push rod 67 which is in turn activated by pneumatic rake operator 68. The rake and rake operator are held in place by cylinder support bracket 69.

A baffle plate 72 in the furnace prevents direct flow from outlet 54 to the exhaust port 73.

Referring now to FIG. 1, a system in which a furnace according to this inventions finds particular use is described. A solid-liquid separator 10 is mounted above an electrically heated furnace 11 with a surge bin 13 therebetween. Carbon enters the solid-liquid separator 10 as a slurry through pipe 14 which has a valve 15 threin to permit the solid-liquid separator to be filled with slurry until sufficient carbon has been introduced thereinto. Thereafter, by closing the valve, the solid-liquid separator is isolated from the source of the carbon slurry. The capacity of the separator must be such that it can be filled and the contents thereof dried sufficient in the time it takes to empty the surge bin 13 through the furnace 11. Typically the separator 10 is fitted with a screen near the bottom that separates the inlet side of the separator from the outlet side. The gate 16 between the separator 10 and the surge bin 13 is in communication with the inlet side of the screen. The liquid portion of the carbon slurry drains from the separator 10 through a drain pipe that is in communication with the outlet side of the screen. When an adequate quantity of carbon has been entered, and the separator valve 15 has been closed, the separator blower 18 is then started to blow air through the carbon to promote dewatering. Thus, heated air is blown (how the air is heated is explained hereafter) into the separator which preferably has a plenum chamber for receiving and distributing the air. The air passes from the plenum chamber, through the wet carbon, through the screen and exits through a drain pipe. The calculated performance of a separator would be as set forth in the following table. Blow-down is at a rate of 1000 cfm.

| Time: | % water retained | | | |
| --- | --- | --- | --- | --- |
|  | 10 min. | 1 hr. | 3 hrs. | 6 hrs. |
| Gravity Drain Only: | 45% | 41% | 39.5% | 38% |
| Blow-Down with Saturated Air: | 44% | 39% | 37% | 35% |
| Blow-Down with Air 15° C. Above Dewpoint: | 44% | 36% | 29% | 17.0% |

The preferred practice comprises blow-down with air sufficiently above the dewpoint and for a period long enough to reduce the percentage of water below 30. In that case, the capacity of the solid-liquid separator and the surge bin must be at least three times the hourly throughput of the furnace.

The water and air flowing through a drain pipe are separated in liquid-gas separator 20. The water is drained to the sewer, for example, via pipe 21. The major portion of the warm moist air is exhausted to the atmosphere. A portion may be passed to recirculation fan 22.

After the carbon has dried sufficiently, the valve 16 is opened. The carbon then falls by gravity down to the surge bin 13. The purpose of the surge bin 13 is to provide a continuous source of carbon for processing in the electric furnace. Carbon is withdrawn from the surge bin by gravity and in a quantity as determined by the operation of the solid flow control mechanism 25 at the base of the furnace 11. Carbon flows through the furnace over a plurality of baffles or trays that cause the carbon to travel in a sinuous path by gravity. The baffles or trays are arranged so that flow from one to the next wll stop when a lower baffle is filled. Thus the rate at which the carbon flows through the furnace can be controlled by a positive flow control mechanism 25 that removes carbon from the lowest baffle. The carbon is heated by the electric heating elements 26 (for example, silicon carbide resistance elements) mounted in the walls of the furnace.

The rate at which the carbon can be processed through the furnace depends to a large degree upon the amount of moisture in the carbon delivered from the surge bin and the power input. The calculated capacity of a furnace and the energy required based upon various moisture contents of the carbon in the surge bin are set forth in the following table.

| Dry Carbon | Moisture | KW/hr. |
| --- | --- | --- |
| 100#/hr. | 50% H$_2$O | 66.1 |
| 120#/hr. | 43% H$_2$O | 62.0 |
| 130#/hr. | 38% H$_2$O | 59.0 |
| 140#/hr. | 33% H$_2$O | 55.2 |
| 150#/hr. | 28% H$_2$O | 48.6 |
| 160#/hr. | 21% H$_2$O | 41.0 |
| 170#/hr. | 17% H$_2$O | 35.8 |

The heating elements 26 are arranged in such a manner as to promote the volatilization and combustion of impurities from the carbon. Near the top of the furnace the carbon is dried. In the next lower porton of the furnace, the volatile impurities are vaporized from the carbon. In the lowest portion of the furnace the residual hydrocarbons are removed from the pores of the activated carbon by reacting this material with water vapor and carbon dioxide. To accomplish this reaction the temperature near the furnace bottom must be sufficiently high so that the reaction can be carried out with a velocity as required by the furnace capacity.

Heat is circulated in the furnace via the heat circulation fan 22. The heat circulation fan draws the correct quantity of gases from the top zone of the furnace and can also bring air and water vapor from the separation chamber 20 for combustion of carbon and adsorbate. Discharge from the circulation fan 22 is into a plenum which forms the bottom of the furnace. In this plenum, heat is absorbed from the regenerated carbon and then the heated gas is discharged into the lower furnace regeneration zone. The gas is additionally heated by the electric heating elements 26 and passes upward across and through the carbon to the furnace exhaust 27.

An air-tight enclosure 30 is provided to collect the regenerated carbon and to keep unwanted air from entering the bottom of the furnace. The enclosure discharge chute 31 is taken to below the surface of the water in a quench tank (not shown). Thus a gas seal is provided. The steam is generated as the hot carbon enters the quench tank and passes upward through the chute 31 and hopper 30. Thus additional steam for reaction with carbon impurities is provided.

A heat exchanger 32 is placed on the exhaust stack 27 to heat the ambient air drawn into pipe 33. The heated air is passed via pipe 35 to the blower 18 on the solid-liquid separator 10.

Having thus described the invention with the detail and particularity required by the Patent Laws, what is desired protected by Letters Patent is set forth in the following claims.

We claim:

1. A furnace for heating particulate material cmprising:
an air-tight shell defining an enclosure,
a heat insulating lining within the shell, the inside of which defines a hollow shaft,
electrical resistance heating elements spaced along the length of the hollow shaft adjacent the insulating lining,
a baffle system supported within the shaft, comprising:
side supports vertically positioned within the shaft;
a plurality of inner trays each defining pairs of sloping surfaces joined at a ridge, said pairs of inner trays spaced vertically and secured by the side supports;
a plurality of outer trays each defining a sloping surface, each of said outer trays arranged to receive material falling from the inner tray thereabove and to deliver material to the ridge of an inner tray therebelow;
said inner and outer trays arranged such that said material forms a flowing bed gently conveyed by gravity down through the furnace from tray to tray in a sinuous path exposing the flowing bed of material first on one side and then on the other and such that flow from an upper to a lower tray stops when the lower tray is filled; and
the side supports having a plurality of openings therein positioned under the inner trays and the space above the upper edges of the outer trays being open such that the surface of the flowing bed while conveyed over both inner and outer trays is exposed to radiation from the heating elements and to circulation of convection gases.

2. A furnace for heating particulate material comprising:
an air-tight shell defining an enclosure,
a heat insulating lining within the shell, the inside of which defines a hollow shaft,
electrical resistance heating elements spaced along the length of the hollow shaft adjacent the insulating lining,
a sealable inlet at the top of the shaft,
a hopper at the bottom of the shaft with a sealable outlet near the bottom thereof,
a discharge table mounted near the top of the hopper,
a baffle system supported within the shaft, comprising:
side supports vertically positioned within the shaft;
a plurality of inner trays each defining pairs of sloping surfaces joined at a ridge, said pairs of inner trays spaced vertically and secured by the side supports;
a plurality of outer trays each defining a sloping surface, each of said outer trays arranged to receive material falling from the inner tray thereabove and to deliver material to the ridge of an inner tray therebelow;
said inner and outer trays arranged such that said material forms a flowing bed gently conveyed by gravity down through the furnace from tray to tray in a sinuous path exposing the flowing bed of material first on one side and then on the other and such that flow from an upper to a lower tray stops when the tray is filled;
the said baffle system arranged to receive material from the inlet and to deliver material to the table,
the side supports having a plurality of openings therein positioned under the inner trays and the space above the upper edges of the outer trays being open such that the surface of the flowing bed while conveyed over both inner and outer trays is exposed to radiation from the heating elements and to circulation of convection gases,
means for pushing material off the discharge table for controlling the rate at which material moves downwardly through the baffle system.

3. The furnace according to claim 1 or 2 having means for circulating gas through the shaft.

* * * * *

UNITED STATES PATENT AND TRADEMARK OFFICE
CERTIFICATE OF CORRECTION

PATENT NO. : 4,455,282

DATED : June 19, 1984

INVENTOR(S) : Gerald E. Marquess et al.

It is certified that error appears in the above-identified patent and that said Letters Patent is hereby corrected as shown below:

Claim 2 - Column 6 Line 54 After "the" insert --lower--.

Signed and Sealed this

Sixteenth Day of October 1984

[SEAL]

Attest:

GERALD J. MOSSINGHOFF

Attesting Officer

Commissioner of Patents and Trademarks